United States Patent
Najima et al.

(10) Patent No.: US 8,618,753 B2
(45) Date of Patent: Dec. 31, 2013

(54) INVERTER DEVICE

(75) Inventors: Kazuki Najima, Aichi-ken (JP);
Fumihiro Kagawa, Aichi-ken (JP);
Hiroshi Fukasaku, Aichi-ken (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 759 days.

(21) Appl. No.: 12/795,857

(22) Filed: Jun. 8, 2010

(65) Prior Publication Data
US 2010/0315024 A1    Dec. 16, 2010

(30) Foreign Application Priority Data
Jun. 11, 2009   (JP) ................................ 2009-140075

(51) Int. Cl.
*H02P 1/00*      (2006.01)

(52) U.S. Cl.
USPC .......................................................... 318/139

(58) Field of Classification Search
USPC .......................................................... 318/139
See application file for complete search history.

(56) References Cited

U.S. PATENT DOCUMENTS

| | | | | |
|---|---|---|---|---|
| 5,796,175 | A * | 8/1998 | Itoh et al. ...................... | 307/10.1 |
| 5,864,474 | A * | 1/1999 | Jang ................. | 363/39 |
| 7,057,361 | B2 | 6/2006 | Kitahara et al. | |
| 7,719,838 | B2 | 5/2010 | Nakajima et al. | |
| 2002/0135328 | A1* | 9/2002 | Hanaoka et al. ................ | 318/37 |
| 2004/0008530 | A1 | 1/2004 | Kitahara et al. | |
| 2004/0105200 | A1 | 6/2004 | Ikeda et al. | |
| 2004/0222767 | A1 | 11/2004 | Ohkouchi et al. | |
| 2005/0007047 | A1* | 1/2005 | Strothmann et al. .......... | 318/268 |
| 2008/0225487 | A1 | 9/2008 | Nakajima et al. | |
| 2010/0213904 | A1* | 8/2010 | Yamada ........................ | 320/166 |

FOREIGN PATENT DOCUMENTS

| | | |
|---|---|---|
| JP | 2000-137503 | 5/2000 |
| JP | 2004-015892 | 1/2004 |
| JP | 2004-336907 | 11/2004 |
| JP | 2005-51838 | 2/2005 |
| JP | 2005-102414 | 4/2005 |
| JP | 2008-220101 | 9/2008 |
| JP | 2008-228502 | 9/2008 |

OTHER PUBLICATIONS

Japan Office Action, mailed Feb. 19, 2013, in corresponding Japanese Patent Applicaion.

* cited by examiner

*Primary Examiner* — Kawing Chan
(74) *Attorney, Agent, or Firm* — Greenblum & Bernstein, P.L.C.

(57) ABSTRACT

An inverter device includes a filter circuit, an inverter circuit, an electric current detecting circuit, a voltage detecting circuit, a control circuit for outputting a drive signal so as to switch switching devices, and an internal power supply. The control circuit includes a shutdown circuit for stopping outputting the drive signal to the switching devices when an electric current flowing through a motor is an overcurrent or a voltage across the inverter circuit is an overvoltage or the voltage outputted from the internal power supply is not stabilized. When electric power by residual charge in the capacitor is used after the inverter device is disconnected from a high-voltage battery, the control circuit generates the drive signal based on a reference waveform and three commands for keeping switching devices corresponding to one phase in either ON or OFF state and for switching ON and OFF the other remaining switching devices.

10 Claims, 5 Drawing Sheets

INVERTER DEVICE

BACKGROUND OF THE INVENTION

The present invention relates to an inverter device for controlling the operation of a three-phase motor.

In a hybrid or an electric vehicle, a motor for driving the vehicle or a compressor is driven by a high-voltage battery and a communication device such as an audio instrument, LIN (Local Interconnect Network) or CAN (Controller Area Network) is driven by a low-voltage battery. In this structure, signals are sent and received through a photocoupler between a CPU for controlling an inverter device for the motor and another CPU for controlling the communication device (refer to, e.g. Japanese Patent Application Publication 2004-336907).

A filter circuit including a coil and a capacitor is provided in input stage of the inverter device for controlling motor drive for suppressing the noise of output voltage of the inverter device. Since the capacitor is provided in the input stage of the inverter device, it takes time for the capacitor storing the electric power to be discharged when it is disconnected from the high-voltage battery and, accordingly, the voltage at the input stage will not decrease quickly. Therefore, when the voltage of the input stage is required to decrease within a predetermined length of time after disconnection from the high-voltage battery, the above structure may not satisfy such requirement.

To reduce the electric power stored in the capacitor in the input stage of the inverter device below a predetermined value in a predetermined length of time, some methods may be contemplated such as connecting a resistor in parallel with the capacitor or connecting a resistor to the capacitor in response to the detection of disconnection from the high-voltage battery. However, in the former case in which the resistor is always connected to the high-voltage battery, power is consumed by the resistor uselessly and the temperature is raised, accordingly. Therefore, the device should be enlarged or the generated heat should be released so that the temperature may not rise excessively. In the latter case, a circuit for detecting the disconnection from the high-voltage battery needs to be added.

To reduce the electric power of the capacitor in the input stage of the inverter device below a predetermined value in a predetermined length of time, the capacitance of the capacitor needs to be decreased, but the inverter device may not be driven properly when the capacitance of the capacitor is simply made small.

The present invention is directed to providing an inverter device that makes it possible for the capacitor in the input stage of the inverter to reduce the voltage at the input stage to a predetermined level within a predetermined length of time by reducing the capacitance of the capacitor, without using an additional circuit for releasing the electric power stored in the capacitor.

SUMMARY OF THE INVENTION

An inverter device includes a filter circuit, an inverter circuit, an electric current detecting circuit, a voltage detecting circuit, a control circuit for outputting a drive signal so as to switch switching devices ON and OFF and an internal power supply. The control circuit includes a shutdown circuit for stopping outputting the drive signal from the control circuit to the switching devices when an electric current flowing through a motor is an overcurrent or a voltage across the inverter circuit is an overvoltage. The shutdown circuit also stops outputting the drive signal from the control circuit to the switching devices when the voltage outputted from the internal power supply is not stabilized. When electric power by residual charge in the capacitor is used after the inverter device is disconnected from a high-voltage battery, the control circuit generates the drive signal based on a triangular reference waveform and three command values for keeping switching devices corresponding to one phase of three phases in either ON or OFF state and for switching ON and OFF the other switching devices corresponding to the remaining two phases.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENT

Figure 1:
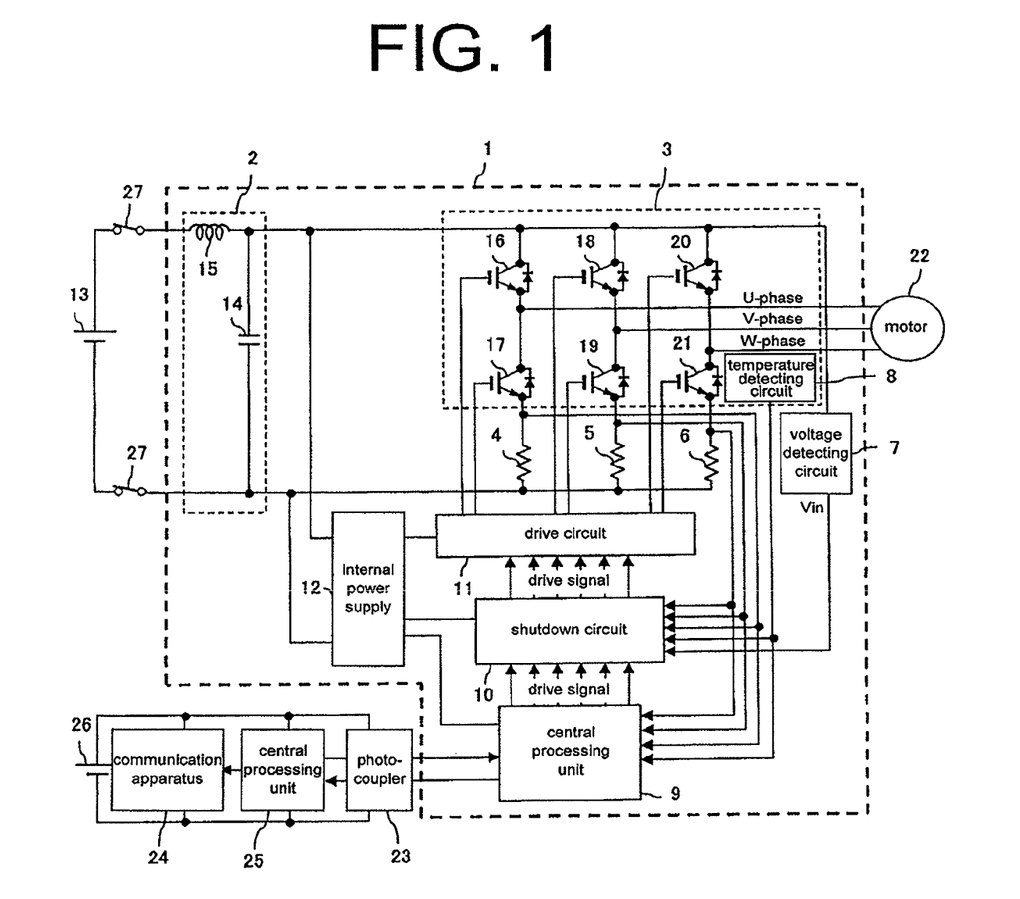
FIG. 1 is a circuit diagram showing an inverter device according to a preferred embodiment of the present invention.

FIG. 1 is the circuit diagram showing the inverter device according to the preferred embodiment of the present invention. The inverter device 1 shown in FIG. 1 is designed to convert direct current into alternate current and to control the operation of a motor for a compressor used in a hybrid or an electric vehicle and includes a filter circuit 2, an inverter circuit 3, shunt resistors 4-6 which serve as an electric current detecting circuit for detecting an electric current flowing through the motor, a voltage detecting circuit 7, a temperature detecting circuit 8, a CPU 9, a shutdown circuit 10, a drive circuit 11 and an internal power supply 12. The CPU 9, the shutdown circuit 10 and the drive circuit 11 cooperate to form a control circuit.

The filter circuit 2 includes a capacitor 14 connected in parallel to a high-voltage battery 13 and a coil 15 provided between the high-voltage battery 13 and the capacitor 14 for suppressing the noise of voltage and current generated by the inverter circuit 3.

The inverter circuit 3 includes n-channel IGBTs (Insulated Gate Bipolar Transistor) 16, 17 connected in series to each other, n-channel IGBTs 18, 19 connected in series to each other and n-channel IGBTs 20, 21 connected in series to each other, and the filter circuit 2 is connected in parallel to the high-voltage battery 13, the IGBTs 16, 17, the IGBTs 18, 19 and the IGBTs 20, 21, respectively. Reference numeral 22 designates a motor having U-phase, V-phase and W-phase windings which are connected to the connection of IGBTs 16, 17, the connection of IGBTs 18, 19 and the connection of IGBTs 20, 21, respectively. Three-phase alternate current flows through the motor 22 by switching the IGBTs 16 through 21 ON and OFF in turn, thereby rotating the rotor of the motor 22. Each switching device forming the inverter circuit 3 is not limited to an IGBT such as a MOSFET (Metal Oxide Semiconductor Field Effect Transistor) having parallel-connected diodes.

The shunt resistors 4, 5, 6 are connected between the IGBT 17 on the lower side of the U-phase and the minus terminal of the high-voltage battery 13, between the IGBT 19 on the lower side of the V-phase and the minus terminal of the high-voltage battery 13 and between the IGBT 21 on the lower side of the W-phase and the minus terminal of the high-voltage battery 13, respectively. The CPU 9 determines electric currents Iu, Iv, Iw flowing through the U-phase, V-phase, W-phase based on voltages applied to the shunt resistors 4-6, respectively. Instead of the shunt resistors 4-6, one shunt resistor may be connected between the emitter of each of the IGBTs 17, 19, 21 and the minus terminal of the high-voltage battery 13. In this case, the CPU 9 detects the voltages across such shunt resistors at predetermined timings and computes the electric currents Iu, Iv, Iw flowing through the U-phase, V-phase, W-phase, based on the detected voltages, respectively.

The voltage detecting circuit 7 detects the voltage Vin applied to the inverter circuit 3. The temperature detecting circuit 8 detects the temperature of the inverter circuit 3. The CPU 9 computes the present position of the rotor of the motor 22 based on the electric currents Iu, Iv, Iw and then determines the voltage commands for the U-phase, V-phase, W-phase, respectively, based on the present position of the rotor and an externally inputted torque command. Then, the CPU 9 generates drive signals for PWM-controlling on/off of the IGBTs 16-21, respectively, using the above three voltage commands and a triangular reference waveform. When the temperature detected by the temperature detecting circuit 8 exceeds a predetermined temperature, the CPU 9 stops outputting the drive signals. The CPU 9 also sends and receives signals through a photocoupler 23 to and from a CPU 25 that controls a communication apparatus 24 dealing with LIN and CAN. The photocoupler 23, the communication apparatus 24 and the CPU 25 are driven by a low-voltage battery 26.

The shutdown circuit 10 is operable to output drive signals outputted from the CPU 9 in the normal state, but not to output the signals in an abnormal state (e.g., when any of the voltages of the shunt resistors 4-6 exceeds a voltage indicating overcurrent or a voltage detected by the voltage detecting circuit 7 exceeds a voltage indicating overvoltage).

The drive circuit 11 outputs drive signals outputted from the shutdown circuit 10 to the gates of the IGBTs 16-21, respectively, thereby driving IGBTs 16-21 ON and OFF.

Based on the voltage outputted from the high-voltage battery 13 through the filter circuit 2, the internal power supply 12 outputs voltages, i.e. V1 to the CPU 9, V2 to the shutdown circuit 10, and V3 to the drive circuit 11.

Switches 27 are provided between the high-voltage battery 13 and the filter circuit 2 of the inverter device 1, connected to the positive and negative terminals of the high-voltage battery 13, respectively, and operable in conjunction with the operation of, e.g., an ignition switch of a vehicle. The switches 27 are closed to connect the high-voltage battery 13 and the inverter device 1 when the ignition switch is turned ON and opened to disconnect the high-voltage battery 13 from the inverter device 1 when the ignition switch is turned OFF.

Figure 2:
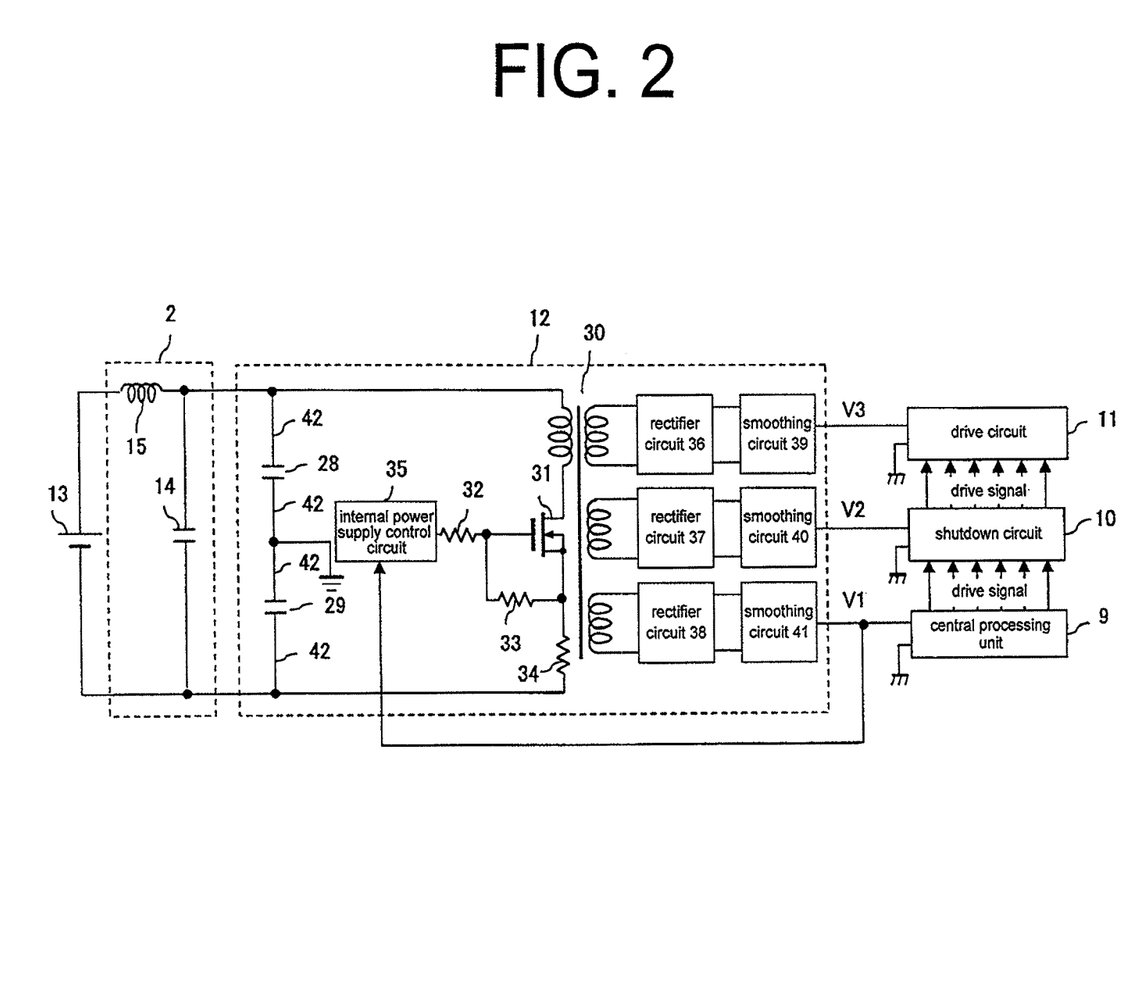
FIG. 2 is a circuit diagram showing an internal power source of the inverter device of FIG. 1.

FIG. 2 shows the circuit diagram of the internal power supply 12. The internal power supply 12 includes capacitors 28, 29, a transformer 30, a n-channel MOSFET 31 as a transistor, resistors 32-34, an internal power supply control circuit 35, rectifier circuits 36-38 and smoothing circuits 39-41. The internal power supply control circuit 35 performs its driving operation based on the voltage inputted to the internal power supply 12. The capacitor 14, the primary coil of the transformer 30, the MOSFET 31 and the resistor 34 are arranged so as to make the loop area of the circuit formed by such parts and devices as small as possible. By so arranging, the noise generated by the loop of the circuit can be reduced. The internal power supply control circuit 35 is connected to a control terminal of the MOSFET 31. The MOSFET 31 is connected to the primary coil of the transformer 30. The primary coil of the transformer 30 is connected to the capacitor 14. The rectifier circuits 36-38 are connected to secondary coils of the transformer 30, respectively. The smoothing circuits 39-41 are connected to the rectifier circuits 36-38, respectively.

The capacitors 28, 29 are connected to each other in series and grounded at a connection point thereof. This connection which is so-called a Y-capacitor connection suppresses a surge voltage inputted to the internal power supply 12. The capacitors 28, 29 are disposed such that the wires 42 connected to the capacitors 28, 29 are as short as possible, which reduces the inductance inherent to the wires 42 and hence the noise caused by such inductance.

Figure 3:
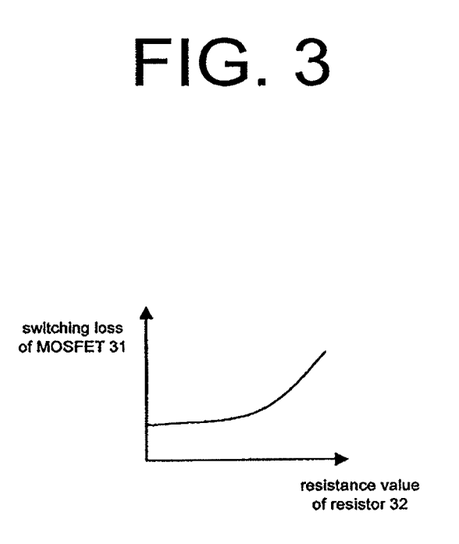
FIG. 3 is a graph showing a relation between the resistance value of a resistor and the switching loss of a MOSFET.

The MOSFET 31 is provided between the primary coil of the transformer 30 connected to the high-voltage side of the capacitor 14 and the low-voltage side of the capacitor 14. The MOSFET 31 is controlled by the internal power supply control circuit 35 in ON and OFF manner and transfers electric power stored in the capacitor 14 to the rectifier circuits 36-38 through the transformer 30. The resistance value of the resistor 32 connected to a control terminal, i.e., the gate of the MOSFET 31 is set to an optimum value in light of the influence of noise on other devices by chattering of the MOSFET 31 and also the switching loss of the MOSFET 31 shown in FIG. 3.

Alternate currents outputted from a plurality of the secondary coils of the transformer 30 are rectified by the rectifier circuits 36-38, smoothed by the smoothing circuits 39-41, and then supplied to the CPU 9, the shutdown circuit 10 and the drive circuit 11, respectively. The power supply voltages V1, V2, V3 are outputted from the smoothing circuits 41, 40, 39, respectively.

Figure 4A:
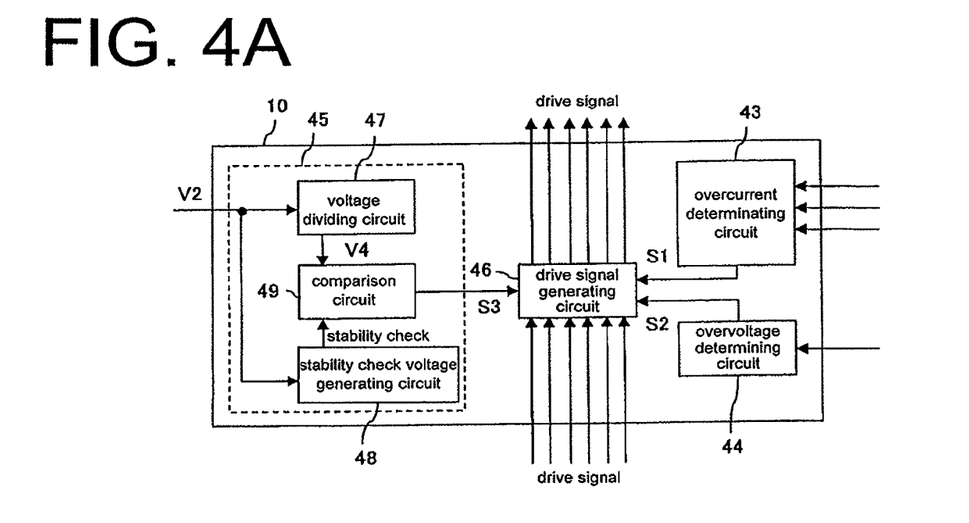
FIG. 4A is a circuit diagram showing a shutdown circuit forming a part of the inverter device and a determining circuit forming a part of the shutdown circuit.

Referring to FIG. 4A, the shutdown circuit 10 includes an overcurrent determining circuit 43, an overvoltage determining circuit 44, a determining circuit 45 and a drive signal generating circuit 46.

The determining circuit 45 includes a voltage dividing circuit 47, a stability check voltage generating circuit 48 and a comparison circuit 49. The shutdown circuit 10 may dispense with the determining circuit 45.

When any of the voltages across the shunt resistors 4-6 exceeds an overcurrent determining voltage, the overcurrent determining circuit 43 outputs an overcurrent signal S1 indicating that any one of the currents Iu, Iv, Iw flowing in the lines of the respective phases of the motor 22 is an overcurrent.

When the voltage Vin detected by the voltage detecting circuit 7 exceeds an overvoltage determining voltage, the overvoltage determining circuit 44 outputs an overvoltage signal S2 indicating that the voltage being applied across the inverter circuit 3 is an overvoltage.

The voltage dividing circuit 47 includes a plurality of resistors and is operable to output a voltage V4 by dividing a voltage V2 outputted from the internal power supply 12. The stability check voltage generating circuit 48 may be provided, e.g., a low-pass filter including a resistor and a capacitor and is operable to smooth the voltage V2 into a stability check voltage. The voltage dividing circuit 47 divides a voltage V2 outputted from the internal power supply 12 into a divided voltage V4 so that the divided voltage V4 corresponds with the stability check voltage outputted from the stability check voltage generating circuit 48 when the voltage V2 is stabilized after its start-up.

Figure 4B:
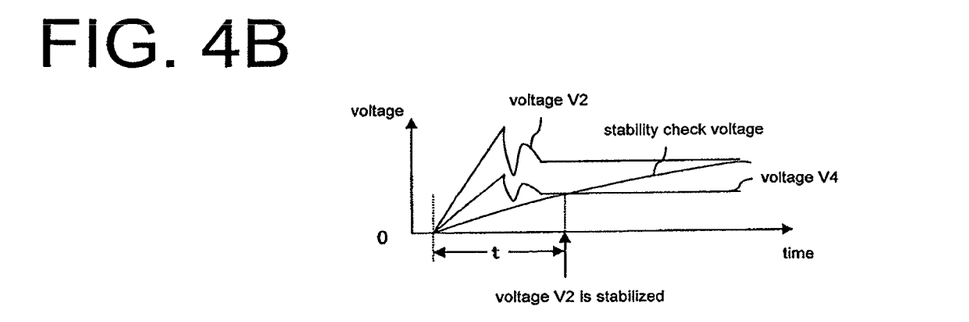
FIG. 4B is a graph showing the relation among internal power supply voltage V2, outputted voltage V4 and safety check voltage of the inverter circuit of FIG. 1.

The comparison circuit 49 includes a comparator and is operable to output a stability signal S3 indicating that the voltage V2 outputted from the internal power supply 12 is not yet stabilized when the stability check voltage is lower than the voltage V4, as shown in FIG. 4B.

The drive signal generating circuit 46 is operable to output drive signals outputted from the CPU 9 to the drive circuit 11 in the normal state, but to stop outputting drive signals from the CPU 9 to the drive circuit 11 in an abnormal state when the drive signal generating circuit 46 receives the overcurrent signal S1 indicating that any one of the three phase alternate currents Iu, Iv, Iw of the motor 22 is an overcurrent, the overvoltage signal S2 indicating an overvoltage being applied across of the inverter circuit 3 and the stability signal S3 indicating that the voltage outputted from the internal power supply 12 is not yet stabilized.

Thus, as shown in FIG. 4B, the inverter circuit 3 is stopped for a length of time t while the voltage V2 outputted from the internal power supply 12 is not yet stabilized, but driven after the voltage V2 is stabilized, with the result that breakdown of the IGBTs 16-21 due to any malfunction thereof is prevented.

Figure 4C:
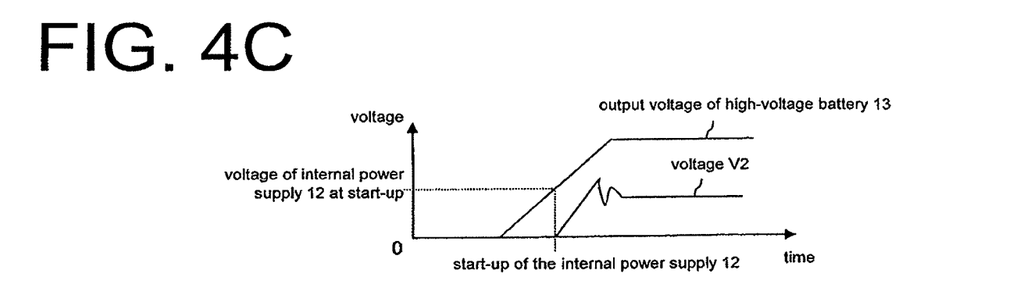
FIG. 4C is a graph showing a state wherein high-voltage battery voltage is applied to the inverter circuit of FIG. 1 before the outputted voltage V2 is stabilized.

As shown in FIG. 4C, the voltage outputted from the high-voltage battery 13 is applied to the inverter circuit 3 before the voltage V2 outputted from the internal power supply 12 is stabilized. Therefore, the IGBTs 16-21 may be damaged if a drive signal which may cause malfunction to the IGBTs 16-21 is outputted from the CPU 9 to the IGBTs 16-21. According to the embodiment of the present invention wherein the inverter device 1 is so formed that outputting drive signals from the CPU 9 to the drive circuit 11 is stopped while the voltage V2 outputted from the internal power supply 12 is not yet stabilized after its start-up. Thus, no drive signal is outputted to the IGBTs 16-21 while the voltage V2 is not stabilized after a start-up of the internal power supply 12 and, therefore, the IGBTs 16-21 is prevented from malfunctioning due to any drive signal which may cause false operation to the IGBTs 16-21.

Thus, the inverter device 1 according to the embodiment of the present invention protects the IGBTs 16-21 from malfunctioning, though the CPU 9 and the like are driven based on a voltage outputted from the high-voltage battery 13 through the filter circuit 2. Therefore, after the inverter device 1 is disconnected from the high-voltage battery 13, the internal power supply 12 can output power supply voltage to the CPU 9 and the like, using the electric power stored in the capacitor 14 of the filter circuit 2 as residual charge. Thus, since the control circuit that is formed by the CPU 9, the shutdown circuit 10 and the drive circuit 11 continues to operate by the electric power stored in the capacitor 14 until the electric power drops below a predetermined value, the electric power stored in the capacitor 14 can be effectively released.

In the inverter device 1 of the embodiment, when the internal power supply 12 outputs power supply voltage to the CPU 9 and the like, using the electric power stored in the capacitor 14 as residual charge, after the inverter device 1 is disconnected from the high-voltage battery 13, a triangular reference waveform is established which is used in generating a drive signal in accordance with the capacitance of the capacitor 14 so that the voltage of the inverter circuit 3 drops below a predetermined value in a predetermined length of time. For example, when the capacitance of the capacitor 14 is to be decreased so that the voltage of the inverter circuit 3 drops below a predetermined value in a predetermined length of time after the disconnection of the inverter device 1 from the high-voltage battery 13, the frequency of the triangular waveform is increased for decreasing the capacitance of the capacitor 14.

Figure 5:
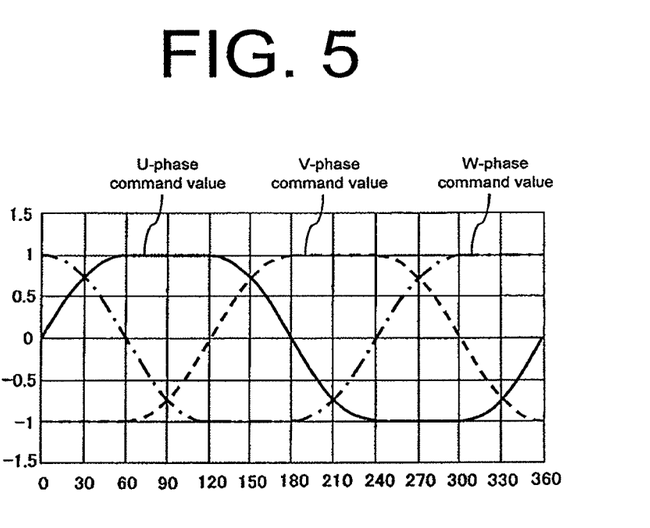
FIG. 5 is a graph exemplifying command values of drive signals in binary phase modulation.

According to the embodiment of the present invention, the voltage of the input stage of the inverter device 1 can be decreased below a predetermined value in a predetermined length of time after the disconnection of the inverter device 1 from the high-voltage battery 13. In the inverter device 1 of the embodiment, when a drive signal is to be generated in PWM, the drive signal is generated by three commands (command values used in so-called "binary phase modulation"). Specifically, according to the three commands, a pair of IGBTs corresponding to one phase of three phases, U-phase, V-phase, W-phase is kept in either on or off state without being switched ON and OFF, but two pairs of IGBTs corresponding to the remaining two phases are switched ON and OFF. For example, when generating a drive signal using each command value of U-phase, V-phase, W-phase shown in FIG. 5 at an angular position of rotor of the motor 22 between 0-60 degrees, IGBTs 16, 17, 20, 21 corresponding to U-phase and W-phase are switched ON and OFF while IGBTs 18, 19 corresponding to V-phase is kept either ON or OFF without making ON-OFF switching operation. At an angular position of the motor 22 between 60-120 degrees, IGBTs 18, 19, 20, 21 corresponding to V-phase and W-phase are switched ON and OFF while IGBTs 16, 17 corresponding to U-phase is kept either ON or OFF without making ON-OFF switching operation. At an angular position of the motor 22 between 120-180 degrees, IGBTs 16, 17, 18, 19 corresponding to U-phase and V-phase are switched ON and OFF while IGBTs 20, 21 corresponding to W-phase is kept either ON or OFF without making ON-OFF switching operation.

Thus, the capacitance of the capacitor 14 can be reduced so that the voltage applied to the inverter circuit 3 drops below a predetermined value in a predetermined length of time after the inverter device 1 is disconnected from the high-voltage battery 13. Accordingly, even if the frequency of the triangular reference waveform is increased, the switching loss of the inverter device can be reduced.

What is claimed is:

1. An inverter device, comprising:
a filter circuit including a capacitor and a coil;
an inverter circuit including a plurality of switching devices, wherein the inverter circuit converts direct current outputted from a high-voltage battery through the filter circuit into three-phase alternate current by switching the switching devices ON and OFF, outputting electric current that is the alternate current to a motor;
an electric current detecting circuit for detecting the electric current flowing through the motor;
a voltage detecting circuit for detecting a voltage applied to the inverter circuit;
a control circuit for outputting a drive signal so as to switch the switching devices ON and OFF, based on the electric current detected by the electric current detecting circuit, wherein the control circuit includes a shutdown circuit for stopping outputting the drive signal from the control circuit to the switching devices when the electric current detected by the electric current detecting circuit is an overcurrent or the voltage detected by the voltage detecting circuit is an overvoltage; and an internal power supply providing electric power to the control circuit by the voltage outputted from the high-voltage battery when the inverter circuit is connected to the high-voltage battery and also providing electric power by residual charge in the capacitor after the inverter device is disconnected from the high-voltage battery, wherein the shutdown circuit includes a determining circuit for determining whether a voltage outputted from the internal power supply is stabilized or not, wherein the shutdown circuit stops outputting the drive signal from the control circuit to the switching devices when the voltage outputted from the internal power supply is not stabilized, wherein, when the residual charge in the capacitor is used after the inverter device is disconnected from the high-voltage battery, the control circuit generates the drive signal based on a triangular reference waveform and three commands for keeping switching devices corresponding to one phase of three phases in either an ON state or an OFF state, and for switching ON and OFF other switching devices corresponding to two remaining phases of the three phases.

2. The inverter device according to claim 1, wherein a frequency of the triangular reference waveform is established in accordance with the capacitance of the capacitor so that the voltage applied to the inverter circuit drops below a predetermined value in a predetermined length of time.

3. The inverter device according to claim 1, wherein the determining circuit further including:
a stability check voltage generating circuit for smoothing the voltage outputted from the internal power supply into a stability check voltage;
a voltage dividing circuit for generating a divided voltage from the voltage outputted from the internal power supply; and
a comparison circuit for outputting a stability signal which has the shutdown circuit stop outputting the drive signal when the stability check voltage is lower than the divided voltage.

4. The inverter device according to claim 3, wherein the stability check voltage generating circuit includes a low-pass filter, the voltage dividing circuit includes a plurality of resistors and the comparison circuit includes a comparator.

5. The inverter device according to claim 3, wherein the inverter device further comprising:
a shunt resistor provided between the switching device of each phase of the motor and a minus terminal of the high-voltage battery, wherein the shunt resistor forms the electric current detecting circuit, wherein the control circuit including:
a drive circuit for driving the switching devices ON and OFF; and
a CPU for generating the drive signal, using voltage commands for respective phases of the motor and a triangular reference waveform, wherein the CPU determines the voltage commands for respective phases based on the electric current from the electric current detecting circuit, wherein the shutdown circuit including:

an overcurrent determining circuit for outputting an overcurrent signal indicating that any one of electric currents flowing in respective phases of the motor is an overcurrent when a voltage across the shunt resistor exceeds an overcurrent determining voltage; and
an overvoltage determining circuit for outputting an overvoltage signal indicating that the voltage applied across the inverter circuit is an overvoltage when the voltage detected by the voltage detecting circuit exceeds an overvoltage determining voltage, and
a drive signal generating circuit for stopping outputting the drive signal from the CPU to the drive circuit when the drive signal generating circuit receives any of the overcurrent signal, the overvoltage signal and the stability signal.

6. The inverter device according to claim 1, wherein the control circuit including:
a drive circuit for driving the switching devices ON and OFF; and
a CPU for generating the drive signal, using voltage commands for respective phases of the motor and a triangular reference waveform, wherein the CPU determines the voltage commands for respective phases based on the electric current from the electric current detecting circuit.

7. The inverter device according to claim 6, wherein the inverter device further comprising:
a shunt resistor provided between the switching device of each phase of the motor and a minus terminal of the high-voltage battery, wherein the shunt resistor forms the electric current detecting circuit,
wherein the shutdown circuit including:
an overcurrent determining circuit for outputting an overcurrent signal indicating that any one of electric currents flowing in respective phases of the motor is an overcurrent when a voltage across the shunt resistor exceeds an overcurrent determining voltage; and
an overvoltage determining circuit for outputting an overvoltage signal indicating that the voltage applied across the inverter circuit is an overvoltage when the voltage detected by the voltage detecting circuit exceeds an overvoltage determining voltage.

8. The inverter device according to claim 1, wherein the control circuit sends and receives a signal through a photocoupler to and from a circuit driven by a low-voltage battery.

9. The inverter device according to claim 1, wherein the internal power supply including:
a transformer, wherein a primary coil of the transformer is connected to the capacitor;
a transistor connected to the primary coil in series;
an internal power supply control circuit connected to a control terminal of the transistor;
a rectifier circuit connected to a secondary coil of the transformer; and
a smoothing circuit connected to the rectifier circuit, wherein when the internal power supply control circuit drives the transistor, the electric power is transferred from the primary coil to the secondary coil, wherein the electric power induced to the secondary coil is rectified by the rectifier circuit, smoothed by the smoothing circuit and supplied to the CPU, the shutdown circuit and the drive circuit, respectively.

10. The inverter device according to claim 1, wherein a switch is provided between the high-voltage battery and the filter circuit of the inverter device, wherein when the switch is turned ON, the filter circuit of the inverter device is connected to the high-voltage battery, and when the switch is turned OFF, the filter circuit of the inverter device is disconnected from the high-voltage battery.

* * * * *